United States Patent [19]

Safonnikov et al.

[11] Patent Number: 4,481,400

[45] Date of Patent: Nov. 6, 1984

[54] METHOD OF ELECTROSLAG WELDING OF LIGHT METALS, FORMING DEVICE AND FLUX

[76] Inventors: Anatoly N. Safonnikov, Ulitsa Filatova, 1/22, kv. 78; Anatoly V. Antonov, Ulitsa Kreisera "Avrora", 1, korpus 2, kv. 104, both of Kiev, U.S.S.R.

[21] Appl. No.: 456,050

[22] PCT Filed: Apr. 22, 1981

[86] PCT No.: PCT/SU81/00040

§ 371 Date: Dec. 21, 1982

§ 102(e) Date: Dec. 21, 1982

[87] PCT Pub. No.: WO82/03585

PCT Pub. Date: Oct. 28, 1982

[51] Int. Cl.³ ............................................. B23K 25/00
[52] U.S. Cl. .................................................. 219/73.1
[58] Field of Search .................. 219/73.1, 73.11, 73.2, 219/126

[56] References Cited

U.S. PATENT DOCUMENTS

| | | | |
|---|---|---|---|
| 2,789,074 | 4/1957 | Miller | 145/26 |
| 3,585,343 | 6/1971 | Crichton | 219/73 |
| 3,610,867 | 10/1971 | Bartle | 219/73.1 |
| 3,710,068 | 1/1973 | Calton et al. | 219/73.1 |
| 4,207,454 | 6/1980 | Safonnikov et al. | 219/73.1 |

FOREIGN PATENT DOCUMENTS

| | | | |
|---|---|---|---|
| 1118056 | 2/1982 | Canada . | |
| 2019318 | 10/1971 | Fed. Rep. of Germany . | |
| 49-2664 | 1/1974 | Japan . | |
| 1303794 | 1/1973 | United Kingdom . | |
| 338328 | 5/1972 | U.S.S.R. . | |
| 671966 | 7/1979 | U.S.S.R. . | |
| 680839 | 8/1979 | U.S.S.R. | 219/73.1 |
| 764902 | 10/1980 | U.S.S.R. . | |

Primary Examiner—C. L. Albritton
Assistant Examiner—Catherine M. Sigda
Attorney, Agent, or Firm—Fleit, Jacobson, Cohn & Price

[57] ABSTRACT

A method of electroslag welding of light metals wherein parts to be welded, a forming device, and an electrode are successively mounted with the provision of a required gap between said parts, following which the gap is filled with a flux, and then a slag pool is set up with following melting of the electrode and the edges with the formation of a metal pool, which is accumulated, maintained in the liquid state and utilized for filling the welding gap with the liquid metal with subsequent solidification of the liquid metal. According to the invention, the metal pool is accumulated outside the gap above the parts being welding, and filling the gap with the liquid metal is carried out after the termination of fusion of the electrode and the parts being welded and accumulation of the metal pool in a volume required for filling the gap considering weld reinforcement.

The method is carried out by means of a forming device which comprises moulds (9), a container (13) disposed above the parts to be welded, and a container (14) disposed under the parts to be welded. According to the invention, the moulds (9) are further provided with porous elements (12) and are constructed with stepped porous grooves (10) forming a supporting platform (11) on which are disposed said porous elements (12) forming with the grooves (10) enclosed cavities. The container (13) disposed above the parts to be welded is further provided with external (16) and internal (17) terminals and a jumper (18) connecting the internal terminals (17). The container (14) disposed under the parts to be welded is further provided with a transverse partition (27).

The flux utilized in the welding process comprises cryolite, barium fluoride and alkali metal bromide.

22 Claims, 4 Drawing Figures

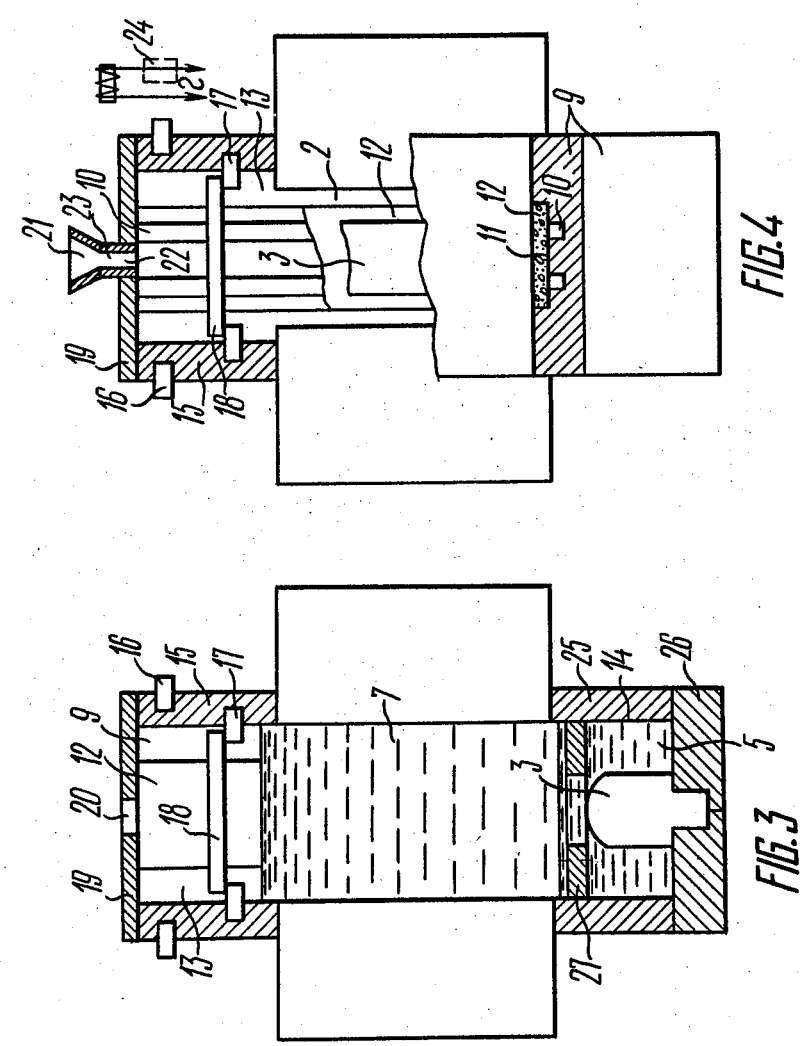

METHOD OF ELECTROSLAG WELDING OF LIGHT METALS, FORMING DEVICE AND FLUX

TECHNICAL FIELD

The invention relates to welding production, and particularly to electroslag welding of light metals whose density is lower than that of a flux, to a forming device for practicing said method, and to a flux utilized in this process.

BACKGROUND ART

Known in the art is a method of electroslag welding of light metals, consisting in successively mounting parts to be welded, with a desired gap therebetween, a forming device, and an electrode (USSR Inventor's Certificate No. 764,902). Following this, the gap between the edges to be welded is filled with a flux, leaving the electrode end extended over the flux surface, and a slag pool is set up. Then the welding current is switched on. As the volume of the slag pool increases, the bottom portion thereof is lowered while exposing new portions of the electrode for melting. In the process of welding the electrode is melted from above downwards, while liquid metal formed as a result of melting the electrode and the slag pool are kept within the gap. After the complete melting of the electrode and fusion of the edges of the parts to be welded, the welding current is disconnected. Metal is solidified within the gap thereby forming a weld.

A device for practicing this method comprises side moulds, a container disposed above the edges to be welded, and a container disposed under said edges. The upper container is defined by the side moulds and bars mounted on the parts to be welded. The lower container in defined by the side moulds and bars mounted under the parts to be welded. The lower container further comprises a tray retaining the flux and the weld pool within the gap.

The weld obtained by the prior art method with the use of the above device possesses insufficiently high performance properties due to incomplete degassing of the weld metal. In the utilization of the above device the setting of the slag pool is also impeded.

Known in the art is a halide-based flux (U.S. Pat. No. 3,585,343), containing in percent by weight:

| potassium chloride | 45 |
| sodium chloride | 27 |
| cryolite (3NaF.AlF$_3$) | 22 |
| lithium chloride | 6 |

Said flux makes it possible to carry out a stable process of electroslag welding, reduces well the oxide film on the welded parts. However, the weld obtained with the use of said flux in the process of welding, is porous and contains an increased amount of gases, thereby resulting in the sharp decrease in mechanical characteristics of welded joints.

DISCLOSURE OF INVENTION

The object of the invention is the provision of a method of electroslag welding of light metals, a forming device and a flux, permitting, by changing process parameters, structural arrangement and by qualitative variation of the flux, the provision of monitoring the composition and structure of the weld metal, thereby upgrading performance characteristics of the weld.

The object set forth is attained by the fact that in a method of electroslag welding light metals, comprising successively mounting parts to be welded, providing a desired gap therebetween, a forming device and an electrode, filling the gap with a flux and setting up a slag pool followed by melting the electrode and the edges to be welded with the formation of a metal pool which is accumulated, maintained in the liquid state and utilized to fill the weld gap with the liquid metal with subsequent solidification of the liquid metal, according to the invention, the metal pool is accumulated outside the gap above the edges to be welded, and filling the gap with the liquid metal is accomplished after the fusion of the electrode and the edges of the parts and accumulation of the pool in the amount required for filling the gap considering weld reinforcement.

The method allows the performance characteristics to be improved due to a practically complete degassing and refining of the weld metal during the accumulation of the metal pool outside the gap above the edges to be welded.

The metal pool is recommended to be additionally blown with an inert gas.

The above modification of the method allows the process of degassing to be intensified.

It is expedient that the inert gas is argon. Said modification of the method is the most economical.

It is possible to introduce additionally into the metal pool substances forming complex compounds with harmful impurities, said compounds being insoluble in metal.

The above modification of the method allows liquid metal to be purified from harmful impurities prior to filling the gap.

It is recommended to use calcium in an amount of 0.15 to 0.5 percent by weight as the substance forming a complex compound with harmful impurities, said compound being insoluble in metal.

The above modification of the method makes it possible to withdraw harmful impurities of iron from liquid metal.

It is expedient to use magnesium in an amount of 0.1 to 1.5 percent by weight as the substance forming a complex compound with harmful impurities, said compound being insoluble in metal.

Said modification of the method permits harmful impurities of silicon to be removed from liquid metal.

The object set forth is also attained by the fact that in a forming device comprising moulds, a container disposed above the edges to be welded, a container disposed under the edges to be welded, according to the invention, the moulds are further provided with porous elements and are constructed with stepped (i.e., rectangular in shape and parallel to one another) longitudinal grooves forming a supporting platform on which are disposed said porous elements forming, together with said grooves, enclosed cavities, the container disposed above the edges to be welded being further provided with internal and external terminals and a jumper connecting the internal terminals, and the container disposed under the edges to be welded is further provided with a transverse partition.

The device ensures the possibility of carrying out the welding process with practically complete degassing and refining of the weld metal. The device also permits the simplification of setting up the slag pool.

The metallic jumper is recommended to be constructed from a metal having a low melting point.

The above modification provides for self-adjustment of the process of setting up the slag pool.

Said modification ensures obtaining a weld whose composition is identical to that of the welded parts.

It is possible that the metallic jumper be constructed from a metal identical to the metal to be welded, said metal containing alloying components.

The above modification ensures additional alloying of the weld metal.

It is recommended to determine the content of each alloying component from the following formula:

$$L_j = (V_w - V_j) \cdot \frac{L_w - [L_{wm}\gamma + L_e(1 - \gamma)]}{V_j} + L_w$$

where
$L_j$ is a content of the alloying component in the jumper, %;
$L_w$ is a content of the alloying component in the weld, %;
$L_{wm}$ is a content of the alloying component in the welded material, %;
$L_e$ is a content of the alloying component in the electrode, %;
$V_w$ is a volume of the weld, cm$^3$;
$V_j$ is a volume of the jumper, cm$^3$;
$\gamma$ is a portion of the welded metal in the weld metal.

The jumper is expedient to be constructed from a refractory material having high electrical resistivity.

The above modification ensures intensification of the process of setting up the slag pool and accompanying heating of the metal pool.

It is most economical to utilize graphite as the refractory material having high electrical resistivity.

It is recommended to construct the partition from a material having a low melting point.

This modification simplifies the final stage of the process.

A metal identical to the welded one is possible to be utilized as the material having a low melting point.

The above modification provides for the possibility of obtaining a weld having minimum content of impurities.

It is recommended to construct the partition from a material reacting with the slag.

Said modification allows the final stage of the process to be intensified.

It is economical to utilize dinas as the material reacting with the slag.

The partition is expedient to be constructed from a refractory material and provided with a slot for mounting the electrode.

The above modification predetermines repeated utilization of the partition.

It is economical to utilize graphite as the refractory material.

The object set forth is also attained by the fact that a flux based on halides, according to the invention, contains cryolite, barium fluoride, and alkali metal bromide.

The flux enables the process stability to be improved, thereby upgrading performance characteristics of the welded joints.

It is expedient that the flux contain components taken in the following ratio, percent by weight;

| | |
|---|---|
| barium fluoride | 65.0–75.0 |
| cryolite | 15.0–25.0 |
| alkali metal bromide | 5.0–10.0 |

Said composition of the flux makes it possible to upgrade the chemical activity with oxide films existing on the edges being welded.

It is most expedient to utilize sodium bromide as the alkali metal bromide.

Said modification allows the process of destructing an oxide film to be intensified.

BRIEF DESCRIPTION OF DRAWINGS

The invention is further explained in terms of detailed description of the best embodiment thereof with reference to the accompanying drawings, in which:

FIG. 3 shows schematically the final stage of the welding process of the invention;

FIG. 4 shows schematically the forming device of the invention.

BEST MODE FOR CARRYING OUT THE INVENTION

Figure 2:
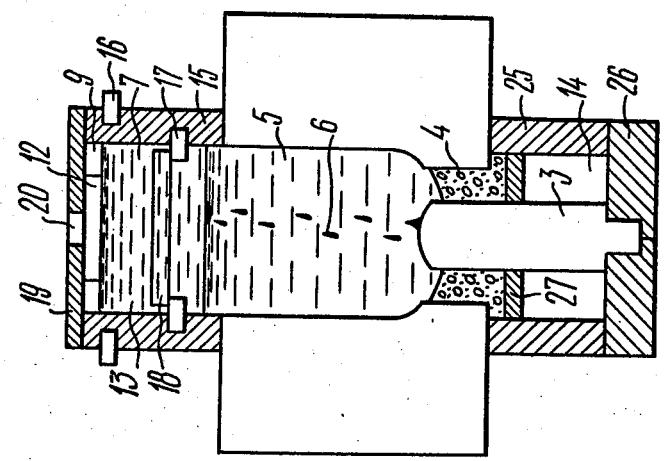
FIG. 2 shows schematically the intermediate stage of the welding process of the invention.
Figure 1:
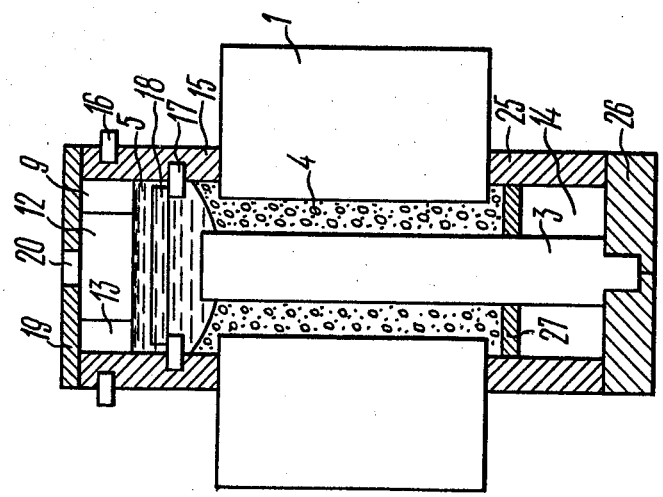
FIG. 1 shows schematically the initial stage of the welding process of the invention.

Welding of aluminium specimens was carried out. For this purpose specimens 1 were mounted on supports with a gap 2 therebetween. Following this, a forming device was assembled on the parts to be welded, and an electrode 3 was mounted. The electrode 3 is disposed along the axis of the gap 2 between the edges to be welded of the specimens 1. Next, the gap 2 is filled with a flux 4. The forming device and the electrode 3 are connected to different poles of a power source, and a slag pool 5 is set up. After setting up the slag pool 5, the welding current was switched on, thereby resulting in the initiation of the welding process (FIGS. 1–3).

The welding electrode 3 and the edges of the specimens 1 are melted, drops of melted metal 6 float to the surface of a more dense slag, thereby forming on the surface thereof a metal pool 7, which pool is maintained in the liquid state outside the gap 2 above the parts being welded. The metal pool 7 may be blown with argon or helium. A mixture of argon and helium may be also utilized. After the accumulation of the metal pool 7 in an amount required for filling the gap 2 considering weld reinforcement, the slag pool 5 is moved out of the gap 2. The place thus liberated in the gap 2 is filled with the liquid metal of the metal pool 7, which metal forms a weld 8 after solidification.

A forming device providing for the above described welding process, comprises moulds 9 having stepped longitudinal grooves 10 forming a supporting platform 11. On the supporting platform 11 are mounted porous elements 12 constructed, e.g., from activated carbon. In the fixation of the porous elements 12 on the supporting platforms 11 enclosed longitudinal cavities are formed within side surfaces of the moulds 9, said cavities allowing gases to be discharged out of the gap in the process of welding. The height of the moulds 9 is determined by the height of the parts 1 and does not depend on the thickness. The forming device further comprises a container 13 disposed above the edges to be welded (an accumulation chamber) and a container 14 located under said edges (a receiver). The walls of the accumulation chamber 13 are formed by the moulds 9 and bars 15 made from graphite, said bars being mounted on the parts 1. The bars 15 are provided with terminals 16, 17. The internal terminals 17 are connected with each other by a jumper 18. The jumper 18 may be constructed from a material having a low melting point which material may be a metal identical to that being welded (FIG. 4).

The metal identical to that being welded may further contain alloying components. The content of each alloying component is calculated from the following formula:

$$L_j = (V_w - V_j) \cdot \frac{L_w - [L_{wm}\gamma + L_e(1 - \gamma)]}{V_j} + L_w$$

where
- $L_j$ is a content of the alloying component in the jumper, %;
- $L_w$ is a content of the alloying component in the weld, %;
- $L_{wm}$ is a content of the alloying component in the welded material, %;
- $L_e$ is a content of the alloying component in the electrode, %;
- $V_w$ is a volume of the weld, cm³;
- $V_j$ is a volume of the jumper, cm³;
- $\gamma$ is a portion of the welded metal in the weld metal.

It is necessary to consider in the calculations the losses of alloying components in the welding process.

The jumper 18 may be also constructed from a refractory material having high electrical resistivity, e.g. tungsten or graphite.

The accumulation chamber 13 is provided with a cover 19 in which there is provided an opening 20 for supplying the flux and gas for creating a protective atmosphere over the surface of the metal pool 7. For feeding the flux 4 the cover 19 may comprise a feed hopper 21. The feed hopper 21 has an outlet duct 22 which may be provided with an electromagnetic shutter 23. The coil of the shutter is connected to a power source (not shown) by a switch 24.

The walls of the container 14 located under the parts to be welded are formed by the moulds 9 and run-off plates 25 constructed from graphite. A tray 26 of said container is made from graphite. The receiver comprises a transverse partition 27 dividing its cavity into two portions.

The partition 27 may be constructed from a material having a low melting point, e.g. from a metal identical to that being welded. Such materials as dinas or fireclay, which react with the slag, may be utilized.

The partition 27 may be also constructed from a refractory material, e.g. graphite. In this case the partition 27 is provided with a slot for mounting the electrode 3.

To practice the method of the invention, a halide-based flux is utilized, said flux containing cryolite, barium fluoride, and alkali metal bromide taken in the following ratio, percent by weight:

| barium fluoride | 65.0–75.0 |
| cryolite | 15.0–25.0 |
| alkali metal bromide | 5.0–10.0 |

Conventional alkali metal bromides may be utilized as the alkali metal bromide, although the most effective is sodium bromide.

The forming device operates as follows. After this device has been assembled on the parts 1 to be welded, said parts made, e.g. from aluminium, the plate electrode 3 is introduced through the slot provided in the partition 27 and into the gap 2 between the specimens 1 to be welded. On the internal terminals 17 of the bars 15 of the accumulation chamber 13 is fixed the jumper 18 made from a refractory material, e.g. graphite. The welding gap 2 and the cavity of the accumulation chamber 13 are filled with the solid flux 4 via the feed hopper 21. The flux 4 fills the accumulation chamber 13 so that the jumper 18 is surrounded from all the sides by the flux 4.

The contacts of the switch 24 of the shutter 23 are closed, i.e. the electromagnetic coil of the shutter 23 is connected to a power supply (not shown), thereby resulting in closing the outlet duct 22 of the feed hopper 21.

A welding current power supply (not shown) is connected to the external terminals 16 of the bars 15. The current, while passing along the graphite jumper 18, overheats the latter, which in turn causes melting of the flux 4 within the cavity of the accumulation chamber 13, i.e. the slag pool is formed. Liquid metal of the melted electrode, floating in the more dense slag pool, forms the metal pool 7.

As the jumper 18 is made from a material having a low melting point, being aluminium in the given case, the metal of the melted jumper mixes with the metal pool 7.

At the moment when the jumper gets melted, which is determined from changes in the readings of an ammeter and voltmeter, the thermal circuit is disconnected and the welding circuit is connected.

A protective medium is created over the surface of the metal pool. This is accomplished by supplying an inert gas into the accumulation chamber through the opening 20 provided in the cover 19 or through the feed hopper 21.

After the electrode 3 has been fused below the level of the partition 27, the slag pool moves into the receiver 14, and the metal pool 7 moves into the gap between the parts 1 being welded.

In the case of utilization of the partition 27 made from a material identical to that being welded, after complete melting of the flux within the gap, said partition gets melted under the effect of the heat of the slag pool, the metal of the partition mixes with the metal pool 7 within the gap 2, and the slag pool 5 moves into the receiver 14. In the utilization of the partition 27 constructed from a material reacting with the slag after the complete melting of the flux within the gap, the material of said partition 27 reacts with the liquid slag 5 thereby resulting in the destruction of the partition 27. The material of the partition 27 passes into the slag pool 5. Similar to the above described modifications of the operation of the device, the slag pool 5 is then replaced within the gap by the liquid metal from the metal pool 7.

The invention is further explained in terms of specific examples.

EXAMPLE 1

Aluminium specimens having a cross-section of 100×100 mm were welded. The parts to be welded were mounted with a gap of 65 mm. Following this, a forming device and an electrode were mounted.

The jumper of the accumulation chamber of the forming device was made from aluminium.

The partition of the receiver of the forming device was made from graphite and provided with an opening to receive the electrode.

A flux of the following composition, in percent by weight, was fed into the gap between the edges to be welded:

| | |
|---|---|
| barium fluoride | 65.0 |
| cryolite | 25.0 |
| sodium bromide | 10.0 |

After a slag pool had been set up, melting of the electrode and fusion of the edges occured with the formation of the metal pool.

| |
|---|
| Welding was performed at the following conditions: |
| welding current = 6.0 kA |
| no-load voltage = 34.0 V |
| welding voltage = 30.0 V |

The metal pool was accumalated above the edges within the accumulation chamber and was maintained in the liquid state. After said pool had been accumulated in a volume of 700 to 750 cm³, the slag pool was moved from the gap into the receiver and was replaced by liquid metal, which formed the weld in the process of solidification. The welding time was 12 min.

EXAMPLE 2

Aluminium specimens having a cross-section of 100×100 mm were welded. The parts to be welded were mounted with a gap of 60 mm. Following this, a forming device and an electrode were mounted.

The jumper of the accumulation chamber of the forming device was made from aluminium alloyed with magnesium.

The partition of the receiver of the forming device was made from dinas.

A flux of the following composition, in percent by weight, was fed into the gap between the edges:

| | |
|---|---|
| barium fluoride | 75.0 |
| cryolite | 20.0 |
| sodium bromide | 5.0 |

After a slag pool had been set up, melting of the electrode and the edges to be welded occured with the formation of a slag and metal pool. The metal pool was accumulated above the edges being welded and was maintained in the liquid state. The metal pool was also blown through with argon.

After the metal pool had been accumulated and all the flux disposed within the gap had been melted, the material of the partition of the receiver reacted with the slag. As a result of this reaction, the partition was destructed, the slag moved into the receiver, and the metal of the metal pool moved into the gap.

Welding was performed at the following conditions:
welding current=5.0 kA
welding voltage=27.0 V As a result of the welding, a weld was formed containing 6.5% Mg.

EXAMPLE 3

Magnesium specimens having a cross-section of 80×90 mm were welded. The parts to be welded were mounted with a gap of 55 mm. Following this, a forming device and a magnesium electrode were mounted.

The jumper of the accumulation chamber was made from graphite.

The partition of the receiver of the forming device was made from magnesium.

A flux of the following composition, in percent by weight, was fed into the gap between the edges to be welded:

| | |
|---|---|
| barium fluoride | 70.0 |
| cryolite | 22.0 |
| sodium bromide | 8.0 |

After a slag pool had been set up, melting of the electrode and fusion of the edges occured with the formation of a metal pool.

| |
|---|
| Welding was performed at the following conditions: |
| welding current = 6,5 kA |
| welding voltage = 28.0 V |

As a result of the welding, a weld was obtained. The welding time was 14 min.

Mechanical tests demonstrated that the ultimate strength of the weld metal obtained in accordance with Examples 1 through 3 was not less than 0.85 of the ultimate strength of the base metal.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

INDUSTRIAL APPLICABILITY

The method of electroslag welding of light metals, the forming device, and the flux are used for welding light metals having a density which is lower than that of the slag.

We claim:

1. A method of electroslag welding of light metals to produce a desire weld reinforcement in which parts having edges to be welded, a forming device, and an electrode are successively mounted and a required welding gap between said parts provided, following which the gap is filled with a flux, a slag pool is set up and a metal pool is formed by melting the electrode and the edges of said parts, said pool is accumulated, maintained in the liquid state and utilized for filling the welding gap with the liquid metal with subsequent solidification of the liquid metal, said method comprising: accumulating the metal pool outside the gap above the parts being welded; and filling the gap with the liquid metal after fusion of the electrode and the edges of the parts has been completed and the accumulated metal pool has a volume sufficient to fill the gap in view of the desired weld reinforcement.

2. A method as defined in claim 1, wherein the metal pool is additionally blown with an inert gas.

3. A method as defined in claim 2, wherein the inert gas is argon.

4. A method as defined in claim 1, wherein substances forming complex compounds with harmful impurities and being insoluble in the metal are additionally introduced into the metal pool.

5. A method as defined in claim 4, wherein the substance forming a complex compound with harmful impurities and being insoluble in the metal is calcium taken in an amount of 0.15 to 0.5 percent by weight.

6. A method as defined in claim 4, wherein the substance forming a complex compound with harmful impurities and being insoluble in the metal is magnesium taken in an amount of 0.1 to 1.5 percent by weight.

7. A forming device for electroslag welding of light metals, comprising moulds, a container disposed above parts to be welded, and a container disposed under the parts to be welded, wherein the moulds are further provided with porous elements and constructed with longitudinal grooves which are rectangular in shape and parallel to one another and which form a supporting platform on which are disposed said porous elements forming together with the grooves enclosed cavities, the container disposed above the parts being further provided with external and internal terminals, a jumper connecting the internal terminals and the container disposed under the parts is further provided with a transverse partition.

8. A forming device as defined in claim 7, wherein the jumper is made of a material having a low melting point.

9. A forming device as defined in claim 8, wherein the material having a low melting point in a metal identical to that being welded.

10. A forming device as defined in claim 7, wherein the jumper is made of a metal identical to that being welded, said metal containing alloying components.

11. A forming device as defined in claim 10, wherein the content of each alloying component in the metallic jumper is calculated from the formula:

$$L_j = (V_w - V_j)\frac{L_w - [L_{wm}\gamma + L_e(1 - \gamma)]}{V_j} + L_w$$

where $L_j$ is a content of the alloying component in the jumper, %;

$L_w$ is a content of the alloying component in the weld, %;

$L_{wm}$ is a content of the alloying component in the welded material, %;

$L_e$ is a content of the alloying component in the electrode, %;

$V_w$ is a volume of the weld, cm$^3$;

$V_j$ is a volume of the jumper, cm$^3$;

$\gamma$ is a portion of the welded metal in the weld metal.

12. A forming device as defined in claim 7, wherein the jumper is made from a refractory material having high electrical resistivity.

13. A forming device as defined in claim 12, wherein the refractory material having high electrical resistivity is graphite.

14. A forming device as defined in claim 7, wherein the partition is made from a material having a low melting point.

15. A forming device as defined in claim 14, wherein the material having a low melting point is a metal identical to that being welded.

16. A forming device as defined in claim 7, wherein the partition is made from a material reacting with the slag.

17. A forming device as defined in claim 16, wherein the material reacting with the slag is dinas.

18. A forming device as defined in claim 7, wherein the partition is made from a refractory material and is provided with a slot for mounting the electrode.

19. A forming device as defined in claim 18, wherein the refractory material is graphite.

20. A flux for electroslag welding of light metals, based on halides, wherein said flux contains cryolite, barium fluoride, and alkali metal bromide.

21. A flux as defined in claim 20, wherein said flux contains components in the following ratio, percent by weight:

| | |
|---|---|
| barium fluoride | 65.0–75.0 |
| cryolite | 15.0–25.0 |
| alkali metal bromide | 5.0–10.0 |

22. A flux as defined in claim 20, wherein the alkali metal bromide is sodium bromide.

* * * * *